May 28, 1940.  J. I. HELLER  2,202,552
RADIO DIRECTION FINDER
Filed Jan. 25, 1934   3 Sheets-Sheet 1
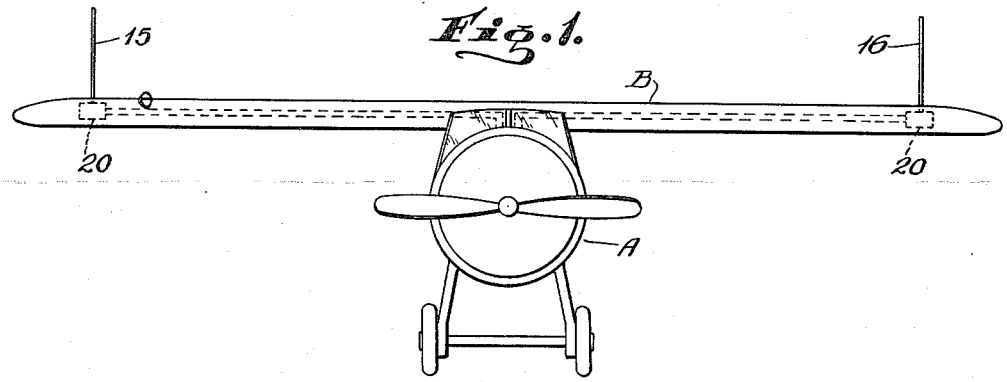
Fig. 1.
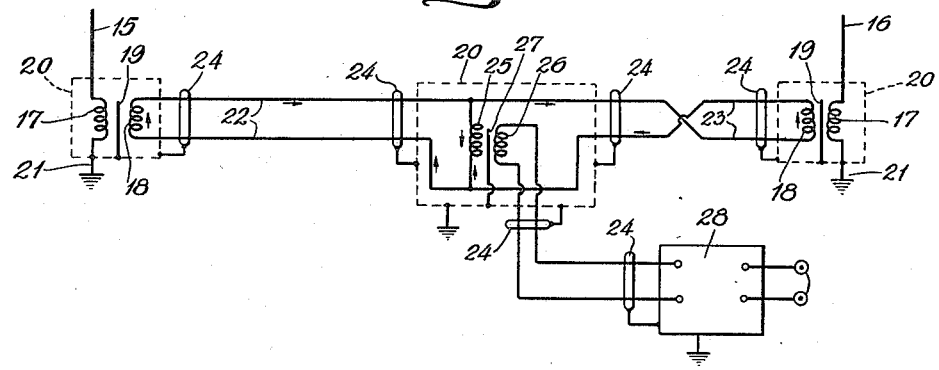
Fig. 2.
Fig. 12.
Fig. 3.
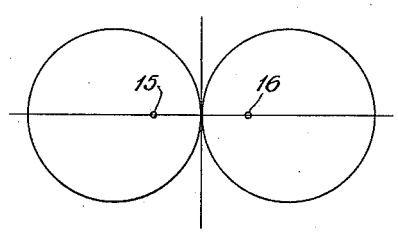
INVENTOR.
JOSEPH I. HELLER
BY C. C. Cousins
ATTORNEY.

May 28, 1940.　　　　J. I. HELLER　　　　2,202,552
RADIO DIRECTION FINDER
Filed Jan. 25, 1934　　　　3 Sheets-Sheet 2
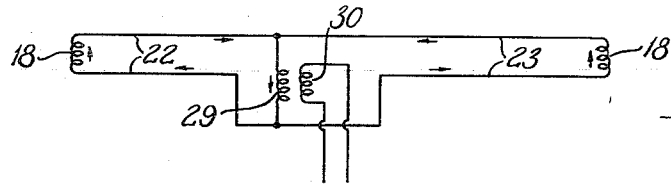
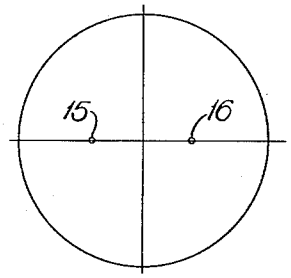
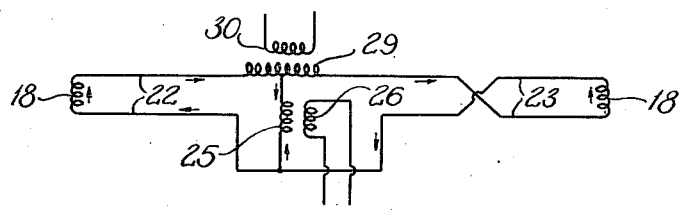
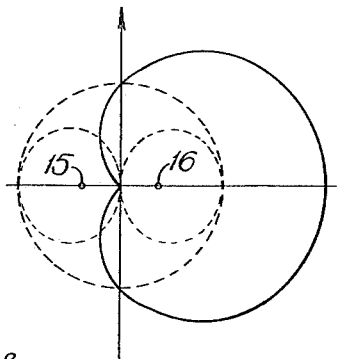
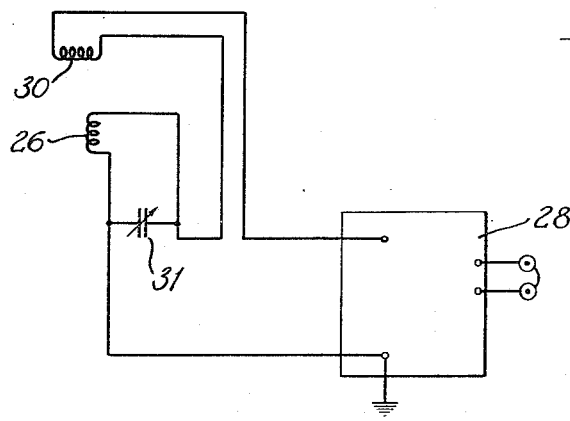
INVENTOR.
JOSEPH I. HELLER
BY C. C. Cousins
ATTORNEY.

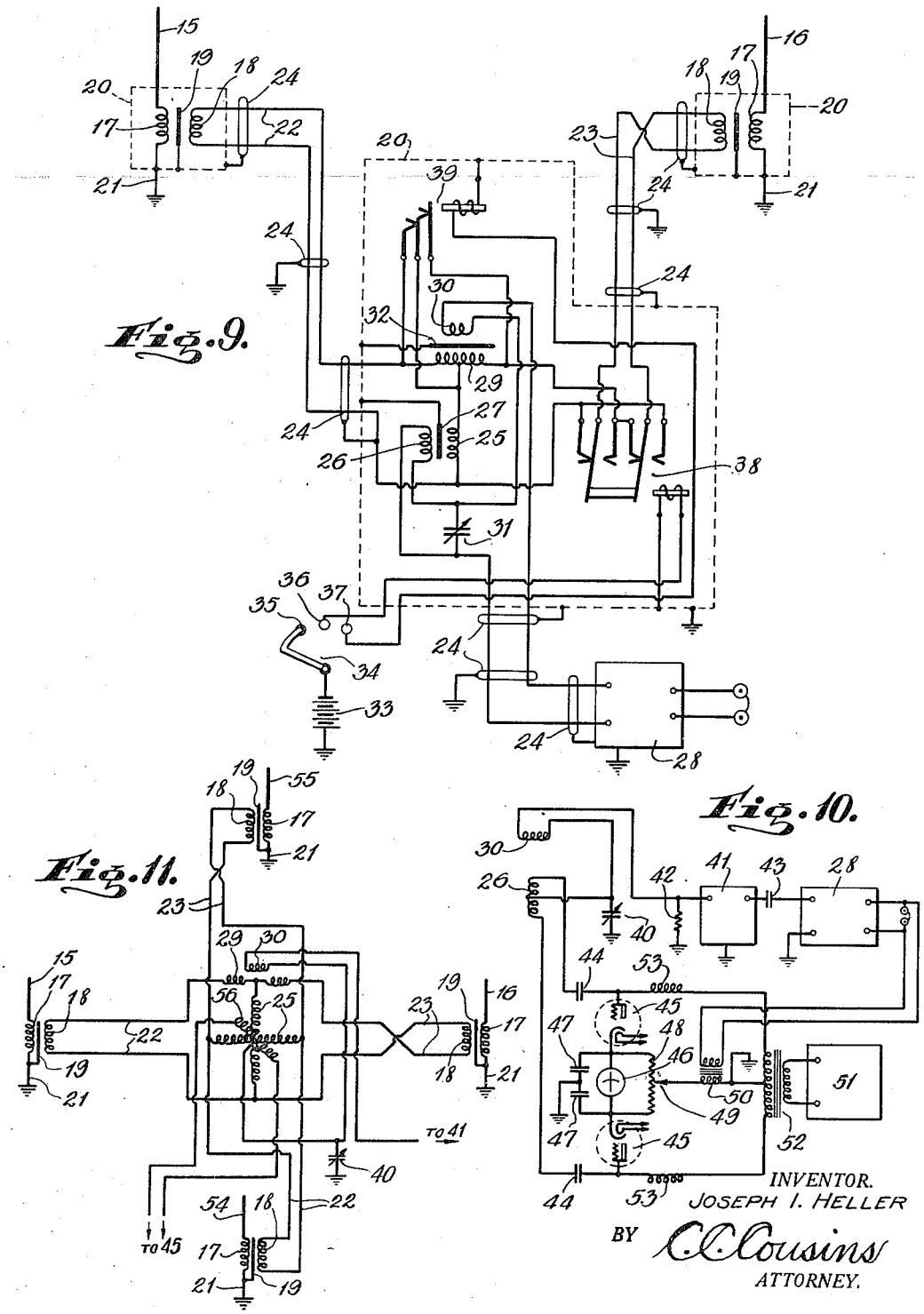

Patented May 28, 1940

2,202,552

UNITED STATES PATENT OFFICE 2,202,552

RADIO DIRECTION FINDER

Joseph I. Heller, Brooklyn, N. Y., assignor to Breeze Corporations, Inc., Newark, N. J., a corporation of New Jersey Application January 25, 1934, Serial No. 708,189

19 Claims. (Cl. 250—11)

This invention relates to radio direction finding and indicating systems. The invention is described in connection with its application to aeroplanes, but it may be used anywhere to determine direction with relation to a source of radio waves.

Loop antennas have been universally used for radio direction finding by reason of the figure-of-eight field-intensity reception pattern afforded by the loop. However, loop antennas have certain disadvantages and the broad object of this invention is to overcome these disadvantages and yet have a figure-of-eight field-intensity reception pattern for directional reception.

One disadvantage of a receiving loop antenna for direction finding is that the loop will receive both vertically and horizontally polarized components of the transmitted wave. The reception of the horizontally polarized component causes serious errors in direction indication. Since these errors are more apparent at night, they are referred to as "night errors" or "night effects." It is generally accepted that night error is caused by sky wave reflection from the Kennelly-Heaviside layer. The horizontally polarized component of the received wave is introduced in and with the sky wave.

Several systems have already been developed to eliminate errors in direction finder bearings due to departure of the received wave from vertical plane polarization. These systems use a loop or equivalent antenna arrangement and attempt to shield or neutralize the horizontal portions of the antenna system. Such constructions are still subject to errors because of ineffective shielding or neutralization and because of coupling between the antenna and horizontal elements. The primary object of this invention is to provide a radio direction finding system free from errors due to horizontal polarization of the received wave and of sufficient sensitivity and flexibility to make it adaptable for use on aircraft and in other mobile services.

A further inherent disadvantage of the loop antenna is that its field-intensity pattern is not efficient for non-directional reception. A further object of the invention is to provide a radio direction finding system which can have a circular field-intensity pattern for non-directional reception with a substantial increase in receiving range over that possible with a loop antenna at maximum.

Where a loop antenna is used for reception the pilot can determine the course of the aeroplane, but has difficulty in telling whether the aeroplane is heading toward or away from the signal source. It is therefore customary to provide a vertical receiving antenna auxiliary to the loop and to combine the received patterns of both in order to determine direction "sense." A further object of the invention is to provide a radio direction finding system which will give selectively a substantially circular field-pattern, or a figure-of-eight pattern, and means to combine the two patterns to produce a cardioid to give direction "sense" without requiring the use of auxiliary antennas.

In application of direction finders to aircraft use, it is important to consider the "drag" or wind resistance introduced by the receiving antenna system. Where a loop antenna together with an auxiliary vertical antenna is required, the "drag" is excessive resulting in a serious objection to the use of direction finders on aircraft. A further object of this invention is to provide an antenna system for aircraft direction finders which introduces a minimum of wind resistance.

It is desirable to be able to receive direction indication from any radio transmitting station. Some transmitting antennas emanate waves having only a vertical polarization; others emanate waves having both horizontal and vertical components. It might be thought that where only a vertical component is transmitted, only a vertical component will be received, and night error would thereby be eliminated. This is not true. Where a receiving loop antenna is used, night error may be introduced by the received horizontal component which may be introduced in the sky wave coming from even a vertical transmitting antenna. High angle radiation from a vertical transmitting antenna may suffer a rotation of its plane of polarization (during refraction through the ionized layer) and may become horizontally polarized in part thereby affecting the horizontal members of a loop receiving antenna. Therefore, a further object of the invention is to provide an antenna system which will receive only the vertical component of a radio wave regardless of the nature of the wave at its point of emanation or at its point of reception.

In some aeroplanes, where space or weight is a particularly important factor, it may not be feasible to carry equipment sufficient for visual indication of direction. Therefore, a further object of this invention is to provide a radio direction finding system which may be used for aural or for visual direction indication, or for both.

A further object of this invention is to provide a radio direction finding system which may be used for directional indication without either rotating an antenna or turning the aeroplane from its course.

The invention consists of the construction, combination and arrangement of parts, as herein illustrated, described and claimed.

In the accompanying drawings, forming part hereof, is illustrated one form of embodiment of the invention, in which drawings similar reference characters designate corresponding parts, and in which:

Figure 1 is a front elevation of a monoplane showing two vertical antennas connected by a transmission line;

Figure 2 is a diagrammatic view of a simple circuit for aural directional reception;

Figure 3 is a diagram of the figure-of-eight field-intensity pattern afforded by the circuit shown in Figure 1;

Figure 4 is a diagrammatic view of the transmission line and its associated parts, the circuit being adapted for non-directional reception;

Figure 5 is a diagram of the circular field-intensity pattern afforded by the circuit shown in Figure 4;

Figure 6 is a diagrammatic view of the transmission line and its associated parts, the circuit being adapted for either directional or non-directional reception;

Figure 7 is a diagrammatic view showing the secondaries of the transformers shown in Figure 6 and the circuit to combine their output for the purpose of direction "sense";

Figure 8 is a diagram of the cardioid field-pattern produced by the circuit shown in Figure 7;

Figure 9 is a diagrammatic view of an aural radio direction finder showing a switching means for selectively using any of the three possible field patterns;

Figure 10 is a diagrammatic view showing the secondaries of the transformers and their association with a circuit adapted for visual direction indication;

Figure 11 is a diagrammatic view of the circuit adapted for direction finding without changing the course of the aeroplane; and, Figure 12 is a diagram showing the sum and difference current vectors.

Referring to the drawings, A, in Figure 1, designates an aeroplane having a single wing B. Near one end of the wing B is disposed a short vertical antenna 15, and a similar antenna 16 is disposed adjacent the other end of the wing. It is obvious that these vertical antennas may be retractable into the wing or hinged so that they may be folded back into the wing, while not in use, in order to reduce wind resistance or to facilitate storage of the aeroplane in crowded hangar space. In the case of a biplane the antennas 15 and 16 may be carried in false struts between the wings.

In Figure 2 is shown a simple direction finding circuit. The antennas 15 and 16 are provided at their bases with coils 17 having secondary coils 18 between which are grounded electrostatic shields 19. The coils 17 are connected to ground 21 and the coils may be enclosed in shielded cases 20. The leads from the secondary coil adjacent the antenna 15 are designated as 22, and the leads from the secondary coil adjacent the antenna 16 are designated as 23. Appropriate shielding 24 may be disposed around the leads 22 and 23, and is connected to the grounded cases 20. The leads 23 are transposed and are connected to the leads 22.

The leads 22 and 23 will not have any antenna effect so that they can not be affected by a horizontal component in a received wave. They constitute transmission lines which are properly terminated so that possible antenna effect is eliminated. The shielding 24 may be affected by the horizontal component by reason of being a conductor cut by the field. However, if any currents are induced in the leads from the shielding 24, such currents will be equal and flow in the same direction in both leads and would be neutralized in the transformers.

A coil 25 having a secondary coil 26 is connected across the leads 22 and 23. This coil and associated apparatus are designed to properly match the transmission lines 22 and 23 so that no reflected waves are produced on said transmission lines. The antennas 15 and 16 are equidistant from the coil 25. The leads 22 are exactly the same length as the leads 23 so that if the impulses are received by the antennas 15 and 16 simultaneously, the currents from the leads 22 and 23 will reach the coil 25 simultaneously. Between coils 25 and 26 is disposed an electrostatic shield 27. The output of the coil 26 is fed into a receiving set 28. The arrows on the diagram indicate the direction of the current through the circuit, at a given instant.

If the aeroplane A is flying directly toward or away from a transmitting station, the antennas 15 and 16 will be equi-distant from the transmitting station. In this case the impulses will be received simultaneously by the antennas 15 and 16 and the currents induced in the secondary coils 18 will be equal and in phase. The currents flowing through the leads 22 and 23 will be equal and in phase; and, when the currents enter the coil 25 from opposite sides they will cancel and there will be no current flowing through the coil 25, and consequently, no current induced in the secondary 26, and therefore no signal will be received by the set 28. This is a condition similar to that which exists when a loop is at right angles to a line between the source of radio waves and the receiver.

If the aeroplane is not headed directly toward or away from the transmitting station, one or the other of the antennas 15 or 16 will be nearer to the transmitting station and the impulse will be received by one antenna before it is received by the other. Under these conditions currents equal but of different phase will be induced in the secondary coils 18, resulting in a current flowing through the coil 25 that will be the vectorial difference of the phases of the two currents in the antenna coils 17. As a result, a current will be induced in the secondary coil 26 and transmitted to the set 28. As the aeroplane A is turned further away from the direction of the transmitting station, the increasing phase difference between the currents in the antenna coils 17 will thus result in an increasing signal in the set 28. When the line of flight of the aeroplane A is at right angles to the line between the source of radio waves and receiver, the phase difference will be at a maximum, resulting in a maximum signal in the set 28. It can therefore be seen that the current induced in the coil 26 and applied to the set 28, is proportional to the vectorial difference of the currents in the antenna coils 17. This affords a figure-of-eight field-intensity pattern of reception, as shown in Figure 3.

In this description, it will be understood that the difference coil (hereinbefore described as coil 25), always affords a figure-of-eight field-intensity pattern, and the sum coil, hereinafter described, affords a substantially circular field-intensity pattern in co-operation with the antenna system.

In order to determine direction, the pilot swings the aeroplane in the same manner as a conventional loop antenna would be rotated. In using a loop antenna on an aural indicating system it is usual to operate on the minimum signal. Therefore, when the set 28 has been tuned to receive signals from a given station, the pilot merely turns the aeroplane to the right or the left, until the signal reaches a minimum intensity, at which time the pilot knows that the aeroplane is flying on a line either toward or away from the station.

In Figure 4 is shown a simple circuit for non-directional reception. A coil 29, having a secondary coil 30, is placed across the leads 22 and 23. The leads 23 are not transposed, with the result that the flow of current from the two coils 18 is now in the same direction through coil 29. This current will represent the vectorial sum of the currents induced in the secondary coils 18. The sum coil 29 is connected across the center of the leads 22 and 23 in like manner as the difference coil 25. The two coils may be physically the same. As will be more fully shown hereinafter, the coil 25 may be used as a difference or a sum coil by merely transposing one set of leads 22 or 23.

Since the current induced in the sum coil 39 is the vectorial sum of the currents from the two antennas 15 and 16, the field-intensity pattern afforded will be substantially circular as shown in Figure 5.

The advantage of the two antennas 15 and 16 over a loop for non-directional reception is shown in Figure 12. $I^1$ represents the current from either antenna 15 or 16, and $I^2$ represents the current from the other antenna. The angle formed by $I^1$ and $I^2$ at C represents the phase difference between the currents. Since the currents are added in the coil 30, the sum vector is shown as the line CD.

In the case of a loop there is a different result. If a single-turn loop of the same height as the antennas 15 and 16 were used, the currents in the two sides of the loop would be equal to $I^1$ and $I^2$, respectively. However, for non-directional reception the greatest current possible from the loop is the difference between $I^1$ and $I^2$ as shown by the difference vector CE. It is therefore clear that the antennas 15 and 16 have a much greater receiving range and are much more efficient than a loop. As more turns are added to the loop, the difference vector CE will increase, but since the possible number of turns on a loop is definitely limited, the difference vector CE will not become as great as the sum vector CD. Furthermore, the smaller the loop, the smaller will be the angle representing the phase difference, with the result that the difference vector for one turn will be smaller and a number of turns will increase the difference vector only in proportion to its original length.

It will be noted that the sum and difference vectors are at right angles or 90° out of phase. When it is desired to use both vectors together, the phase of the difference vector may be shifted 90° to the dotted line position, so as to be 180° out of phase, or it may be shifted so as to bring it into phase with the sum vector.

A further disadvantage of a loop is that it is not suitable for use on a wide band of radio frequencies. However, when properly designed, the two antennas 15 and 16 may be used on any frequency as long as their separation does not exceed one half wave length of the received radio wave. As the frequency is increased, the phase difference between the currents in the antennas 15 and 16 will increase, resulting in an increased signal in the set 28.

In Figure 6 is shown a circuit including both the difference coil 25 and the sum coil 29. The leads 23 are transposed and the sum coil 29 is placed in series with the leads 22 and 23. The upper end of the difference coil 25 is connected to a center tap on the coil 29. Appropriate switching means, hereinafter described, are provided so that the output of coil 26 may be used for directional reception, or the output of coil 30 may be used for non-directional reception. It will be obvious that changes may be made in the circuits shown in Figures 2, 4, and 6, to accomplish the desired results. It is not necessary that the leads 23 be crossed. If the leads 23 are not crossed, the coil 29 will receive a current representing the vectorial difference between the currents in the coils 18, and the coil 25 will receive a current representing the vectorial sum of the currents induced in the coils 18.

As stated above, when the proper course has been found, the pilot may not know whether the aeroplane is heading directly toward or away from the station. This condition is known as 180° error or ambiguity. In order to overcome this error it is necessary to provide means to give the pilot what is generally referred to as direction "sense." This is done by combining the output of coils 26 and 30, as shown in the simple circuit of Figure 7.

Since the output of coil 26 will be 90° out of phase with the output of coil 30, a variable condenser or other suitable device 31 is placed in parallel with coil 26 so as to change the phase of its output by 90°.

By combining the field-intensity patterns afforded by the sum and difference coils, a cardioid may be produced as shown in Figure 8. In order to get direction "sense," the pilot merely has to turn the aeroplane to the right. As shown in Figure 8, if the aeroplane is flying in the direction indicated by the line of flight and is then turned to the right, the signal will decrease. In this case the pilot knows that the aeroplane is heading toward the transmitting station and he can thus remove the 180° ambiguity in his previous direction observation. It may be clearly seen that if the aeroplane were headed in the opposite direction, the signal would increase as the aeroplane was turned to the right. If one coil is reversed, the cardioid pattern is reversed, and direction "sense" is reversed.

In Figure 9 is shown a complete circuit for aural reception, including a switching means so that the operator may selectively use a figure-of-eight field pattern, a circular pattern, or a cardioid. It will be obvious that other common switching circuits may be used to produce the same results. In the present circuit the coil 25 is selectively used for both sum and difference by transposition of the leads 23. Coil 29 is used only as a sum coil and is used only when it is desired to combine both field-intensity patterns for direction "sense." An electrostatic shield 32, heretofore not shown, is disposed between coils 29 and 30. A battery 33 is provided and has one terminal grounded and the opposite terminal connected to a three-position switch 34 which may selectively close contacts 35, 36 and 37. A relay 38 is provided to transpose the leads 23, and a second relay 39 is provided to short-circuit the coil 29.

When the parts are in the position shown, the switch 34 is in position 35 and neither relay 38 nor 39 is energized. Relay 39 short-circuits the coil 29. The leads 23 are transposed but the relay 38, in the position shown, has the effect of retransposing the leads 23 so that the coil 25 acts as a sum coil, and affords a circular pattern for non-directional reception.

When directional reception is desired the switch 34 is placed in position 36. This energizes relay 38 which reverses the leads 23 and makes the coil 25 a difference coil and provides directional reception. The coil 29 is still short-circuited.

When a cardioid pattern is desired for direction "sense", the switch 34 is placed in position 37. The contact arm of the switch 34 contacts both 36 and 37. This energizes both relays 38 and 39. As stated, the operation of relay 38 makes the coil 25 a difference coil, and the operation of relay 39 removes the short-circuit from coil 29 which now functions in its usual manner as a sum coil. The output of the two coils is combined, as shown in Figures 7 and 8, to give direction "sense."

In Figure 10 is shown a circuit for use with a visual direction indicator. The secondary coil 30 of the sum coil, and the secondary coil 26 of the difference coil, are combined with a phase-shifting condenser 40. One lead from coil 30 is connected to a mid-point tap of coil 26. This lead also goes to condenser 40, whose other terminal is grounded. The other lead from coil 30 is connected to the input of a radio frequency amplifier 41. A resistance 42 serves to complete to ground the external direct current circuit of this input.

The output of radio frequency amplifier 41 is applied to the input of receiving set 28 through a blocking condenser 43. The ends of the secondary coil 26 go through two radio frequency condensers 44 to the anodes of two tubes 45 used as rectifiers. A zero-center meter 46 is connected between the cathodes of tubes 45. Two radio frequency condensers 47, in series, with the common connection grounded, are shunted across meter 46. Also in parallel across meter 46 is a resistor 48 having a variable center tap 49. The output of receiving set 28 contains a transformer 50 whose secondary coil is connected between center tap 49 and ground. An audio frequency oscillator 51 is provided and its output goes to a transformer 52 whose secondary has a grounded mid-point tap. The ends of the secondary winding of the transformer 52 are connected to the anodes of tubes 45, through radio frequency chokes 53.

Voltage from transformer 52 is applied to the anodes of tubes 45, causing equal current to flow alternately in these tubes. When the anode of one of the rectifier tubes 45 passes current its resistance is low and the corresponding lead from coil 26 is effectively grounded through this tube and the corresponding condenser 47. Obviously, each end of coil 26 will be alternately grounded. Since the combination of coils 30 and 26, and condenser 40 affords a cardioid field-intensity pattern, similar to that shown in Figure 8, using first one-half of coil 26 and then the other half, will cause the cardioid to reverse, alternately, at a rate determined by the frequency of audio oscillator 51. The meter 46 is in the audio frequency circuit containing the transformer 52, but the rate of reversal of direction of the equal current flow through meter 46 is so high that there is no visible movement of the pointer on the meter 46.

When coil 26 is grounded at one end, a signal at the output of receiving set 28 is proportional to the received field-intensity pattern at that time, and the current through meter 46 is a resultant of voltage of oscillator 51 and the output signal voltage.

When coil 26 is grounded at the other end, similar conditions exist, but there is a reversal of the field-intensity pattern as well as a reversal of direction of the output signal current in meter 46.

If the aeroplane A is not heading directly toward or away from the transmitting station, the reversal of the field-intensity pattern will cause a difference in the voltages applied to opposite sides of the meter 46. This will give a reading on one side or the other of zero on the meter 46. If the aeroplane A is heading directly toward or away from the transmitting station, the reversal of the field-intensity pattern will produce the same voltage on both sides of the meter 46 and the meter 46 will give a zero reading.

It will be obvious that meter 46 may be connected so that the pointer indicates the side off-course or so that the pointer indicates the direction of the transmitting station. The former plan is believed to be more rational and is therefore the recommended system. If the pointer is to the right of zero-center, it shows that the aeroplane is off-course on the right and that it should be swung to the left to bring the pointer to zero-center which will mean that the aeroplane is on-course.

In order to get direction "sense" it is necessary that the aeroplane A be turned slightly off-course so that the meter will have a reading on one side or the other. Under these conditions, if the aeroplane A is headed in a general direction toward the station, and is turned in a direction according to the above-stated rule, to bring it back on its course, the indicator on the meter 46 will return to zero. However, if the aeroplane A is headed in a general direction away from the transmitting station, a change in direction according to the above-stated rule, to bring the aeroplane back on its course, will cause meter 46 to show a greater deviation from course, thereby indicating that the aeroplane is heading away from the transmitting station.

In Figure 11 is shown a circuit for direction finding without the necessity of moving the aeroplane from its course. In addition to the antennas 15 and 16 and their associated parts, a second set of antennas 54 and 55, with similar associated parts, are provided. The antennas 54 and 55 are placed on the aeroplane at right angles, in a horizontal plane, to the antennas 15 and 16. Difference coils 25 are applied across each set of leads 22 and 23. The two coils 25 are at right angles to each other, and a rotatable coil 56 is disposed adjacent the coils 25. One set of leads 22 and 23 is provided with a sum coil 29 having the usual secondary 30, one end of which is connected to the center of coil 56, and the other end of which is connected to a radio frequency amplifier 41, as shown in Figure 10. The output from coil 56 is fed to the tubes 45 in like manner as the output of coil 26, as shown in Figure 10. The effect of rotating coil 56 is the same as the effect produced by turning the aeroplane with the circuits heretofore described. In this manner, bearings may be taken from transmitting stations located to the left or the right of the course, without the necessity of turning the aeroplane from its course.

Various combinations of the circuits herein described may be made, if desired. The circuit of Figure 10 may be used for non-directional reception, but since the circular field-intensity pattern gives a greater range of reception, switching means may be included so as to use only one coil for non-directional reception. The circuits of Figures 9 and 10 may be combined so that optional aural or visual indication is provided. The circuit of Figure 11 may be completed for either visual or aural indication and switching means may be included.

From the foregoing it will be seen that the systems herein described may be applied in connection with either aural or visual direction indication. There is no possibility of night error by reason of the fact that the antennas, being vertical, can be affected only by the vertically polarized components of the received waves. At the same time, a simple circuit is provided so that the antennas may be used for either directional or non-directional reception or "sense" indication.

Having thus fully described the invention, what is claimed as new and desired to be secured by Letters Patent is:

1. In a radio direction finding system, a plurality of vertical receiving antennas adapted to receive only vertically polarized components of radio waves, means to combine the impulses received by the individual antennas to produce a cardioid receiving response pattern readily obtainable for any one of a wide range of received radio frequencies, and auxiliary means for rapidly reversing said cardioid response pattern for use in operating a visual direction indicator.

2. A radio direction finder comprising, in combination, a radio receiving set, a pair of vertical antennas, a two-conductor transmission line, means for inductively coupling each of said antennas to said transmission line with a minimum of capacitive coupling thereto, means for taking off from the electrical center of said transmission line simultaneously the sum of and the difference between the impulses received by the antennas, associated means for combining the said sum and difference of said impulses to form a cardioid receiving response pattern for any one of a wide range of received radio frequencies and for applying the said combined impulses to the input of said radio receiving set.

3. A radio direction finder comprising, in combination, a radio receiving set, a pair of vertical antennas, a two-conductor transmission line, means for inductively coupling each of said antennas to said transmission line with a minimum capacitive coupling thereto, means for taking off from the electrical center of said transmission line simultaneously the sum of and the difference between the impulses received by the antennas, associated means for combining the said sum and difference of said impulses selectively in phase addition or in phase opposition for any one of a wide range of radio frequencies, and auxiliary means for successively applying each of said combinations to the input of said radio receiving set.

4. In a radio direction finder, an antenna system adapted to prevent errors in direction indication caused by horizontally polarized components of radio waves comprising a pair of vertical antennas adapted to receive only vertically polarized components of said radio waves, a two-conductor transmission line, means for inductively coupling each of said antennas to said transmission line with a minimum of capacitive coupling thereto, means for taking off from the electrical center of said transmission line both the sum of and the difference between the impulses received by said pair of vertical antennas, said means being of predetermined input impedance so as to terminate said transmission line at its electrical center in the proper impedance required to completely absorb the impulses traveling along the line from said pair of antennas and thereby to prevent pick-up in said transmission line of horizontally polarized components of the radio wave being received.

5. In a radio direction finder, a radio receiving set, an antenna system adapted to prevent errors in direction indication caused by horizontally polarized components of radio waves comprising a pair of vertical receiving antennas, a two-conductor transmission line, means for inductively coupling each of said antennas to said transmission line with a minimum of capacitive coupling thereto, two primary transformer coils connected to the electrical center of said transmission line and of proper impedance to absorb completely the impulses traveling along said line from said antennas whereby pick-up of horizontally polarized components of the received radio wave in said transmission line is eliminated, one of said primary transformer coils being connected to respond to the difference between the impulses received by said antennas and the other to the sum of said impulses, two secondary coils associated each with one of said primary coils, means for readily varying the phase of the impulse in one of the said secondary coils so that the impulses induced in said secondary coils may be put substantially in time phase or in time phase opposition for any one of a wide range of received radio frequencies, and auxiliary means for combining the impulses of said secondary transformer coils successively in phase addition and in phase opposition in the input of said radio receiving set.

6. In a radio direction finder, an antenna system adapted to prevent errors in direction indication caused by horizontally polarized components of radio waves comprising a pair of vertical antennas adapted to receive only vertically polarized components of said radio waves, a two-conductor transmission line, means for inductively coupling each of said antennas to said transmission line, two independent primary transformer coils connected to the center of said transmission line, two independent secondary transformer coils, each being associated with one of the primary coils, means to take off from one of the secondary coils the sum of the received impulses, means to take off from the other of the secondary coils the difference between the impulses received, means to combine the said sum and difference of the received impulses and apply the result to the input of a receiver and means to valve the output of the receiver on a meter.

7. In a radio direction finder system, a course-indicating device, a plurality of vertical antennas, means for inducing voltages having a circle pattern from voltages received by said antennas, means for inducing voltages having a figure-of-eight pattern from voltages received by said antennas, means for combining said induced voltages, and means for supplying said combined voltages to said course-indicating device to give a continuous, positive course indication.

8. In a radio direction finder system, a course-indicating device, a vertical antenna array, means for producing from voltages received by said antenna array a radio frequency field having the characteristics of an open antenna, means for producing from voltages received by said antenna array a radio frequency field having the characteristics of a loop antenna, and means for combining said fields and transmitting the resultant voltages at audio frequencies alternately to the opposite terminals of said course-indicating device.

9. A radio direction finder system comprising means for producing a current of known frequency and constant amplitude, means including a plurality of vertical antennae for receiving radio frequency current from a transmitting station, means for producing from said received radio frequency current a current of the same frequency as said known frequency, and of an amplitude dependent upon the angle of deviation of said antennae from a straight line passing through the transmitting station and perpendicularly bisecting a line joining the antennae, means for combining said currents of said known frequency, and an indicating means operably responsive to the added currents for indicating the said angle of deviation.

10. A radio direction indicating system comprising a vertical antenna array, a plurality of inductively coupled coils coupled to said array, a circuit coupled to said certain of said coils for producing from currents received by said array currents having the characteristics of currents received in a directional antenna, a second circuit coupled to certain of said coils for producing currents having the characteristics of currents received by a non-directional antenna, means for modulating said directional currents, and means for combining said modulated currents with said non-directional currents.

11. A radio direction indicating system comprising a plurality of spaced non-directional antennas, a circuit connected to said antennas for taking in-phase voltages from said antennas, a second circuit connected to said antennas for taking out-of-phase voltages from said antennas, means for combining said in-phase and out-of-phase voltages, a course-indicating device, and means for supplying said combined voltages to said course-indicating device to give a continuous, positive course indication.

12. A direction indicating system comprising a plurality of spaced vertical antennas, a circuit coupled to said antennas and including a plurality of coils, a circuit connected to said coils and operable therewith to provide currents having the characteristics of currents induced in a non-directive antenna system, a secondary coil inductively coupled to said first named coils, a directive antenna circuit including said secondary coil, means for modulating current from the directive antenna circuit, means for combining said modulated current with current from the non-directive antenna circuit to provide combined currents, means for amplifying and detecting said combined currents, and means for supplying said combined currents to the terminals of a course indicating device.

13. A direction indicating system comprising a plurality of spaced vertical antennas, a plurality of coils coupled to said antennas, a circuit connected to said coils and operable to provide the effect of a non-directional antenna system, a secondary coil inductively coupled to said coils, a circuit including said secondary coil and operable to provide the effect of a directional antenna, a local source of alternating current, a circuit connected to said directional antenna circuit and adapted to be energized by said local source for modulating current received in said directional antenna circuit, means for combining current induced in said non-directional antenna circuit with modulated current from said directional antenna circuit, means for amplifying and detecting said combined currents, the detected current having a frequency equal to that of the current produced by the local source, an amplitude dependent upon the deviation of a line joining the source of received waves and the mid-point of the vertical antenna array from a line perpendicularly bisecting a line joining the antennas, and a phase dependent upon the sense of said deviation, means for combining the detected currents with current from the local source to produce output currents, and means for supplying said output currents to the terminals of a course indicating device.

14. In a radio direction finder system, a course-indicating device, a vertical antenna array, means cooperating with said antenna array for producing voltages having a circle pattern, means cooperating with said antenna array for producing voltages having a figure-of-eight pattern, means for combining said voltages, and means for supplying said combined voltages to said course-indicating device to give a continuous, positive course indication.

15. In a radio direction finder system, a course-indicating device, a vertical antenna array, means for producing from voltages received by said antenna array a radio frequency field having the characteristics of an open antenna, means for producing from voltages received by said antenna array a radio frequency field having the characteristics of a loop antenna, and means including a detector for combining said fields and transmitting the resultant voltages at audio frequencies to the opposite terminals of said course-indicating device for giving a continuous, positive course indication.

16. A radio direction indicating system comprising a plurality of spaced non-directional antennas, a circuit connected to be affected by current received by said non-directional antennas for providing currents having the characteristics of currents received by a directional antenna, a circuit connected to be affected by current received by said non-directional antennas for providing currents having the characteristics of currents received by a non-directional antenna, means for combining currents in said directional and non-directional circuits, a course-indicating device, and means for simultaneously modulating currents in said directive circuit and supplying said combined currents to opposite sides of said course-indicating device.

17. In a radio direction indicating system, a plurality of spaced non-directional antennas, a course-indicating device, means for supplying to one terminal of said course-indicating device a current proportional in amplitude to the amount of phase displacement of the voltages received in said antennas, and means for supplying to the other terminal of said course-indicating device a current displaced 180° in space phase from the phase of the current supplied to said first terminal and having an amplitude proportional to the amount of phase displacement of the voltages received in said antennas.

18. In a radio direction finder system, a vertical antenna array, a hybrid coil connected to said array comprising primary coils and a secondary coil, means for taking out-of-phase voltages from said secondary coil to produce the effect of a loop antenna, and means for taking in-phase voltages from said primary coils to produce the effect of an open antenna.

19. In a radio direction indicating system, a course-indicating device, a plurality of energy collectors, means for inducing voltages having a circle pattern from voltages received by said collectors, means for inducing voltages having a figure-of-eight pattern from voltages received by said collectors, means for combining said induced voltages, and means for supplying said combined voltages to said course-indicating device to give a continuous, positive course indication.

JOSEPH I. HELLER.